US012728432B2

(12) United States Patent
Munz

(10) Patent No.: US 12,728,432 B2
(45) Date of Patent: Sep. 8, 2026

(54) FLUID DEVICE

(71) Applicant: Festo SE & Co. KG, Esslingen (DE)

(72) Inventor: Gebhard Munz, Schorndorf (DE)

(73) Assignee: Festo SE & Co. KG, Esslingen (DE)

( * ) Notice: Subject to any disclaimer, the term of this patent is extended or adjusted under 35 U.S.C. 154(b) by 215 days.

(21) Appl. No.: 18/778,146

(22) Filed: Jul. 19, 2024

(65) Prior Publication Data

US 2025/0025898 A1 Jan. 23, 2025

(30) Foreign Application Priority Data

Jul. 21, 2023 (DE) ......................... 102023119300.7

(51) Int. Cl.
*B05D 1/28* (2006.01)
*B05B 1/28* (2006.01)
*B05B 14/00* (2018.01)

(52) U.S. Cl.
CPC ................ *B05B 1/28* (2013.01); *B05B 14/00* (2018.02)

(58) Field of Classification Search
CPC ......... B05B 1/28; B05B 14/00; F04B 43/046; F04B 43/0054
See application file for complete search history.

(56) References Cited

U.S. PATENT DOCUMENTS

| | | | | |
|---|---|---|---|---|
| 4,939,405 | A * | 7/1990 | Okuyama | F04B 43/046 310/317 |
| 2008/0213134 | A1 | 9/2008 | Bigus et al. | |
| 2022/0034310 | A1 | 2/2022 | Giousouf et al. | |

FOREIGN PATENT DOCUMENTS

| | | | |
|---|---|---|---|
| DE | 198 47 869 | A1 | 4/2000 |
| DE | 10 2004 062 923 | A1 | 7/2006 |
| DE | 10 2020 209 594 | B3 | 12/2021 |
| EP | 3 851 674 | B1 | 8/2023 |
| JP | H03-12917 | A | 1/1991 |

OTHER PUBLICATIONS

Office Action issued in German Patent Application No. 10 2023 119 300.7, Apr. 27, 2024, 8 pages.

* cited by examiner

*Primary Examiner* — P. Macade Nichols
(74) *Attorney, Agent, or Firm* — HSML P.C.

(57) ABSTRACT

A fluid device has at least one valve unit and at least one recirculation unit, each having a fluid chamber, which channels are fluidically connected to one another via at least one connection channel. The at least one feed channel discharges into the fluid chamber of the valve unit and a discharge channel discharges into the fluid chamber of the recirculation unit. Each of the fluid chambers is delimited by an elastically deformable diaphragm, and the valve unit and the recirculation unit each contain an actuation unit through which the associated valve diaphragm or recirculation diaphragm can be adjusted within the meaning of a change in volume of the associated fluid chamber. A fluidic connection can be established between the feed channel and the connection channel by the valve diaphragm and that a continuous fluidic connection exists between the connection channel and the discharge channel via the fluid chamber.

22 Claims, 9 Drawing Sheets

FLUID DEVICE

This application claims priority to German Patent Application No. 102023119300.7 filed Jul. 21, 2023, which is incorporated by reference.

The invention relates to a fluid device with at least one valve unit and at least one recirculation unit, each having a fluid chamber designed to receive a fluid.

Such fluid devices, also called suck-back units, have already been known for a long time, for example from JP H03-12917. There, a fluid device is described which is used during the production of semiconductors, offering the possibility of sucking back a fluid located in a fluid channel in order to prevent undesired dripping at a discharge opening. The suck-back effect can be caused by a negative pressure which can be generated in a fluid chamber of the fluid device to which the fluid channel is connected. The fluid chamber is delimited by an elastically deformable diaphragm.

A fluid device is likewise known from DE 10 2020 209 594 B3, in which the diaphragm can be actuated by means of a piezo actuator.

SUMMARY OF THE INVENTION

The object of the invention is to produce a fluid device of the type named at the outset, which is designed to be simple and compact and can be operated reliably.

This object is achieved by a fluid device with the features of independent claim 1. Developments of the invention are shown in the dependent claims.

The fluid device according to the invention possesses at least one valve unit and at least one recirculation unit, each having a fluid chamber designed to receive a fluid, which channels are fluidically connected to one another via at least one connection channel, wherein at least one feed channel discharges into the fluid chamber of the valve unit and a discharge channel discharges into the fluid chamber of the recirculation unit, and wherein each of the fluid chambers is delimited by an elastically deformable diaphragm, and wherein the valve unit and the recirculation unit each contain an actuation unit through which the associated valve diaphragm or recirculation diaphragm can be adjusted within the meaning of a change in volume of the associated fluid chamber, wherein a fluidic connection can be established between the feed channel and the connection channel by the valve diaphragm and that a continuous fluidic connection exists between the connection channel and the discharge channel via the fluid chamber of the recirculation unit.

Both the valve unit and the recirculation unit each have an elastically deformable diaphragm and an actuation unit for the diaphragm. The valve unit and the recirculation unit are thus components which are designed to be substantially identical in construction, which minimises production costs. The fluid device is suitable for carrying out media separation through the valve unit, whereby it can be used as a suck-back unit during metering or liquid handling in the semiconductor industry, or in the med lab field. For example, the fluid device is suitable to be used with microtiter plates in liquid handling.

In a development of the invention, valve diaphragm and recirculation diaphragm are arranged in diaphragm planes parallel to one another. Expediently, valve unit and recirculation unit are arranged behind one another in alignment direction, wherein the valve diaphragm and the recirculation diaphragm are then likewise arranged behind one another in alignment direction.

In particularly preferred manner, valve diaphragm and recirculation diaphragm are identical in design.

The material of the diaphragm expediently complies with the medium with which the diaphragm comes into contact. For example, thermoplastics such as polyaryletherketone (PEEK), polytetrafluoroethylene (PTFE), perfluoroalkoxy polymers (PFA) or rubbers, such as fluorine rubber (FKM), are suitable here.

In a development of the invention, the diaphragm centres of valve diaphragm and recirculation diaphragm lie on a common diaphragm axis.

In particularly preferred manner, the fluid device has a base plate, with a fitting surface on which the valve unit and the recirculation unit are arranged and attached by means of attachment means. However, in principle, the use of the fluid device without such a base plate would also be conceivable.

In particularly preferred manner, the diaphragm planes of the valve diaphragm and of the recirculation diaphragm are aligned perpendicular to the fitting surface. It is thus possible to arrange at least one valve unit and at least one recirculation unit one behind another in alignment direction on the fitting surface, wherein the diaphragm planes of each of the valve units or recirculation units can then likewise be aligned perpendicular to the fitting surface one behind another in alignment direction. This design is particularly space-saving.

In the development of the invention, the base plate has at least one supply opening for feeding the fluid and a discharge opening for discharging the fluid is provided, wherein a fluid channel system communicating with the channels in the valve unit and the recirculation unit extends between the supply opening and the discharge opening.

In a development of the invention, the discharge opening is designed at a discharge nozzle arranged at the base plate and belonging to the fluid device.

It is possible that a feed opening of the feed channel and a connection channel opening of the connection channel of the valve unit are arranged on the same side of the valve unit, preferably on a bottom side of the valve unit facing the fitting surfaces.

It is also possible that a connection channel opening of the connection channel and a discharge channel opening of the discharge channel of the recirculation unit are arranged on the same side on the recirculation unit, preferably on a bottom side of the valve unit facing the fitting surface.

In a development of the invention, the fluid chambers of the valve unit and of the recirculation unit have the same diameter. In particularly preferred manner, the actuation unit of the valve unit and the actuation unit of the recirculation unit are identical in design.

This leads to a reduction in production costs, as the components of the actuation unit can be produced independently of the type of unit in which they are later used.

In a development of the invention, the actuation unit has an actuation power unit and an actuation member connected to the diaphragm such that an actuation movement transferred by the actuation power unit to the actuation member prompts the actuation member to adopt different positions so that the associated diaphragm causes a volume change in the fluid chamber by elastic deformation.

In a development of the invention, the actuation member is designed as an in particular plate-shaped actuating lever, firmly clamped on one side via a lever bearing, is coupled to the associated diaphragm via a catch element and at its free lever end is coupled to the actuation power unit such that the actuation movement transferred by the actuation power unit prompts the actuating lever to pivot. The actuation unit is thus overall relatively simply and thus robustly constructed.

In particularly preferred manner the actuation power unit is designed as an electric actuation power unit, in particular as an actuation power unit in the form of a step motor or DC motor.

In particularly preferred manner, a longitudinal axis of the actuation unit is designed parallel to the fitting surface. In use condition, the actuation unit is thus designed transverse, whereby the overall height of the fluid device can remain relatively low.

In a development of the invention, the actuation power unit has an output shaft driven rotationally about an axis of rotation, which shaft is coupled to an eccentric element arranged eccentric to the axis of rotation, which element is coupled to the actuating lever, in particular the free lever end thereof.

In a development of the invention, a reset element for resetting the actuation member and the linked diaphragm is associated with the actuation member within the meaning of reducing the volume of the associated fluid chamber.

In particularly preferred manner, the reset element is designed as a spring, in particular a leaf spring. Expediently, the leaf spring is supported at both ends at a cover.

In a development of the invention, the fluid chamber of the valve has a hump-shaped channel which forms the valve seat which can be sealed by the associated diaphragm.

In a development of the invention, a stroke sensor is provided for determining the stroke of the actuation lever.

In particularly preferred manner, the free lever end of the actuation lever is associated with the stroke sensor, and the lever end measures the stroke of the lever end of the actuation lever.

It is possible to regulate the stroke path of the actuation lever via the stroke sensor within the meaning of regulating to the sensor signal, wherein specific voltage signals are associated with specific opening positions. If the predetermined sensor signal or voltage signal is not achieved, this indicates that the desired opening position has not been reached. It can then be readjusted until the desired opening position has been reached.

In a development of the invention, the fluid device has a housing which carries all assemblies.

It is possible that the fluid chambers of the valve unit and of the recirculation unit are designed in a fluid body which can be integrated simply into the housing, with the result that, for example in simple manner, a recirculation unit can be formed by exchanging the fluid body from a valve unit.

BRIEF DESCRIPTION OF THE DRAWINGS

A preferred embodiment example of the invention is represented in the drawing and explained below in more detail. There are shown in the drawings.

DETAILED DESCRIPTION OF THE INVENTION

Figure 1:
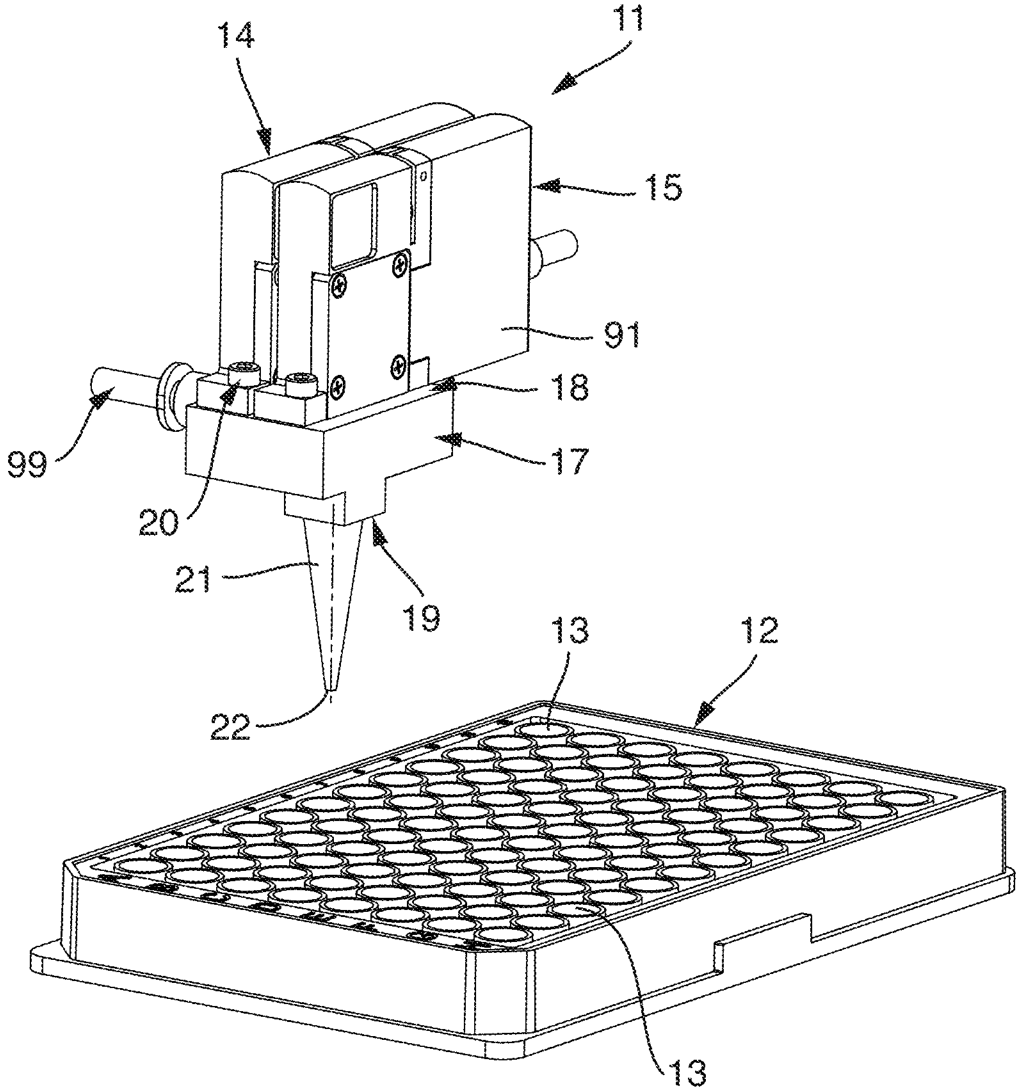
FIG. 1 a perspective representation of a preferred embodiment example of the fluid device according to the invention during use on a microtiter plate, FIG. 2 a perspective representation of the fluid device from FIG. 1 without microtiter plate, FIG. 3 a perspective representation partially as exploded representation of a valve unit or recirculation unit used in the fluid device of FIGS. 1 and 2, FIG. 4 an exploded representation of the valve unit or recirculation unit from FIG. 3, wherein here, compared with FIG. 3, the view of the other side of the housing is shown, FIG. 5 a partial section representation of a valve unit used in the fluid device of FIGS. 1 and 2, without the housing, FIG. 6 a section through the valve unit of FIG. 5 along the line VI-VI from FIG. 5, FIG. 7 a horizontal section through the valve unit of FIG. 6 along the line VII-VII from FIG. 6, FIG. 8 a section through the valve unit of FIG. 5 similar to the section from FIG. 6, wherein the actuation element adopts a different position, FIG. 9 a section similar to the section from FIG. 6, wherein here the recirculation unit is shown instead of the valve unit, FIG. 10 a section through the recirculation unit of FIG. 9, wherein the actuating lever adopts a different position compared with the position from FIG. 9, FIG. 11 a horizontal section through the recirculation unit along the line XI-XI in FIG. 10, and FIG. 12 a longitudinal section through the recirculation unit of FIGS. 9 and 10, wherein the actuating lever is located in a different position.

FIGS. 1 to 12 show a preferred embodiment example of the fluid device 11 according to the invention. The fluid device 11 is used hereinafter by way of example as a metering device for liquid media. As shown by way of example in FIG. 1, the fluid device can be used with microtiter plates 12 in the med lab field for liquid handling. This application is purely by way of example.

In the shown application, a microtiter plate 12 is thus provided which is shown by way of example in the form of a 96-well microtiter plate which thus has 96 cavities. The fluid device 11 has the task in selected of the cavities 13 to dispense a specific quantity of liquids. Self-evidently, it is also possible to use quite different sizes of microtiter plates 12.

In any case, the task of the fluid device 11 is to dose a specific quantity of a liquid into the respective cavity 13. As these are mostly relatively small quantities, in particular in the microlitre range, there is the need for the quantity to be dosed precisely. An undesired dripping at the discharge opening 22 of the fluid device 11 is absolutely to be avoided.

For this purpose, the fluid device 11 has at least one valve unit 14 and at least one recirculation unit 15. As described in even more detail hereinafter, the valve unit 14 ensures that a fluid transit, in particular in the region of a valve seat, can alternately be opened or closed, wherein when the fluid passage is open, the fluid to be dosed, thus in the exemplary case the liquid, can arrive at the discharge opening 22 and there be dispensed into the associated cavity 13. Upon actuation, the associated recirculation unit 15 produces a suck-back effect by means of negative pressure, whereby a fluid still located in the fluid channel is recirculated in order to prevent the previously described negative effect of the undesired dripping.

Figure 2:
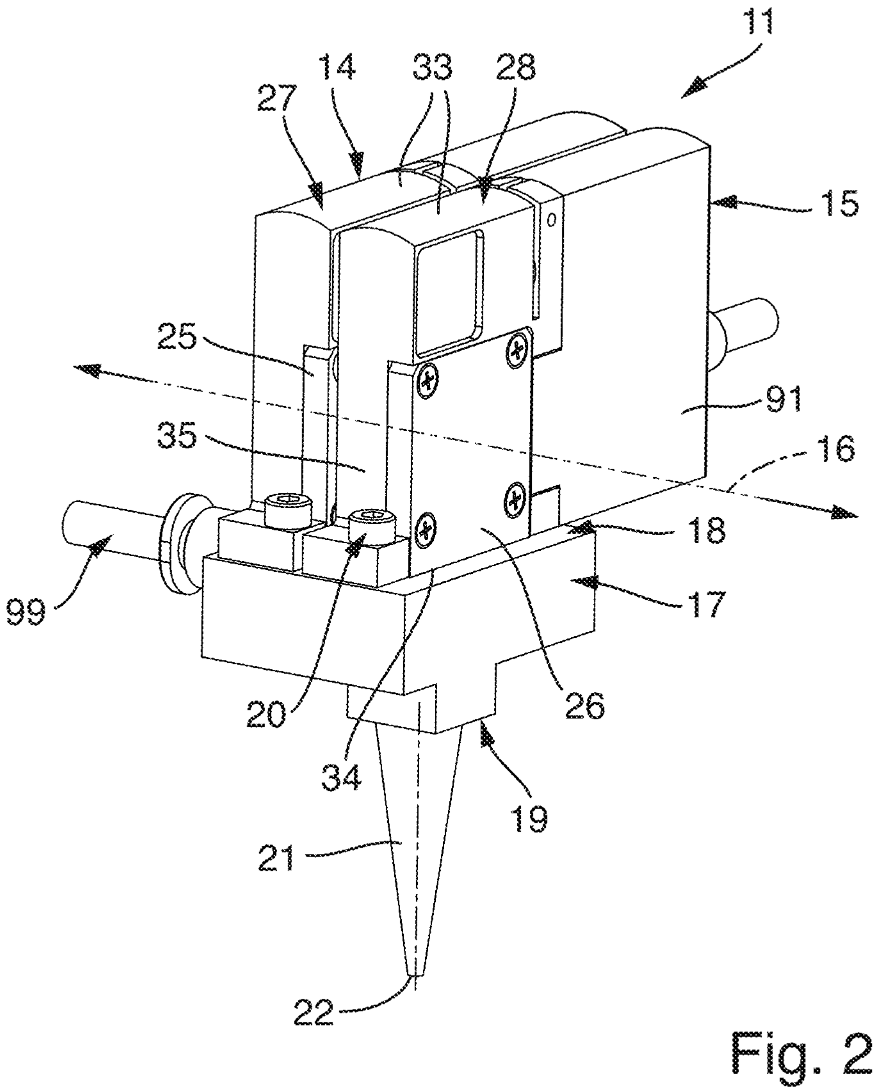

In the shown exemplary case the fluid device 11 consists of a single valve unit 14 and a single recirculation unit 15 which are arranged one behind another along an alignment direction 16 (FIG. 2). It is self-evidently possible to use several valve units and several recirculation units, wherein in this case one of the recirculation units is then also associated with a respective valve unit.

In the shown exemplary case, the fluid device 11 possesses, in addition to the valve unit 14 and the recirculation unit 15, a base plate 17 which has on the top side a fitting surface 18 and on the bottom side a discharge interface 19.

As shown in particular in FIGS. 1 and 2, the valve unit 14 and the recirculation unit 15 are attached to the fitting surface 18 of the base plate 17 by means of attachment means 20. In the shown exemplary case, a screw connection is chosen here between the valve unit 14 or the recirculation unit 15 respectively and the base plate 17, while it is self-evidently also possible to use other types of attachment means, for example a click, snap or clip connection which can be actuated without using any tools.

As shown in particular in FIG. 2, the base plate 17 possesses at least one supply opening (not shown) for feeding the medium or fluid in the exemplary case of the liquid. As shown in FIG. 2, a feed line 99 is arranged at the supply opening which is designed by way of example as a feed tube. The feed tube can for example be coupled with a tube connector to the supply opening.

It is possible that the alignment direction 16 runs not as shown by way of example in FIG. 2 substantially parallel to the feed line 99 but perpendicular thereto, for example in the event that a minimum grid dimension is required parallel to the feed line 99.

The base plate 17 also possesses an outlet opening (not shown) for fluid on the bottom side discharge interface 19. A fluid channel system (not shown) communicating with the channels in the valve unit 14 and the recirculation unit 15 extends between the supply opening and the outlet opening.

As also shown in FIG. 2, a discharge nozzle 21 is arranged at the outlet opening on the underside discharge interface 19 of the base plate 17, which nozzle is fluidically connected to the outlet opening. A fluid channel (not shown) which ends at a discharge opening 22 arranged at the free end of the discharge nozzle 21 extends through the discharge nozzle 21.

As in particular the synopsis of FIGS. 4, 5, 6 and 10 shows, the valve unit 14 and the recirculation unit 15 each possess a fluid chamber 23, 24.

Figure 3:
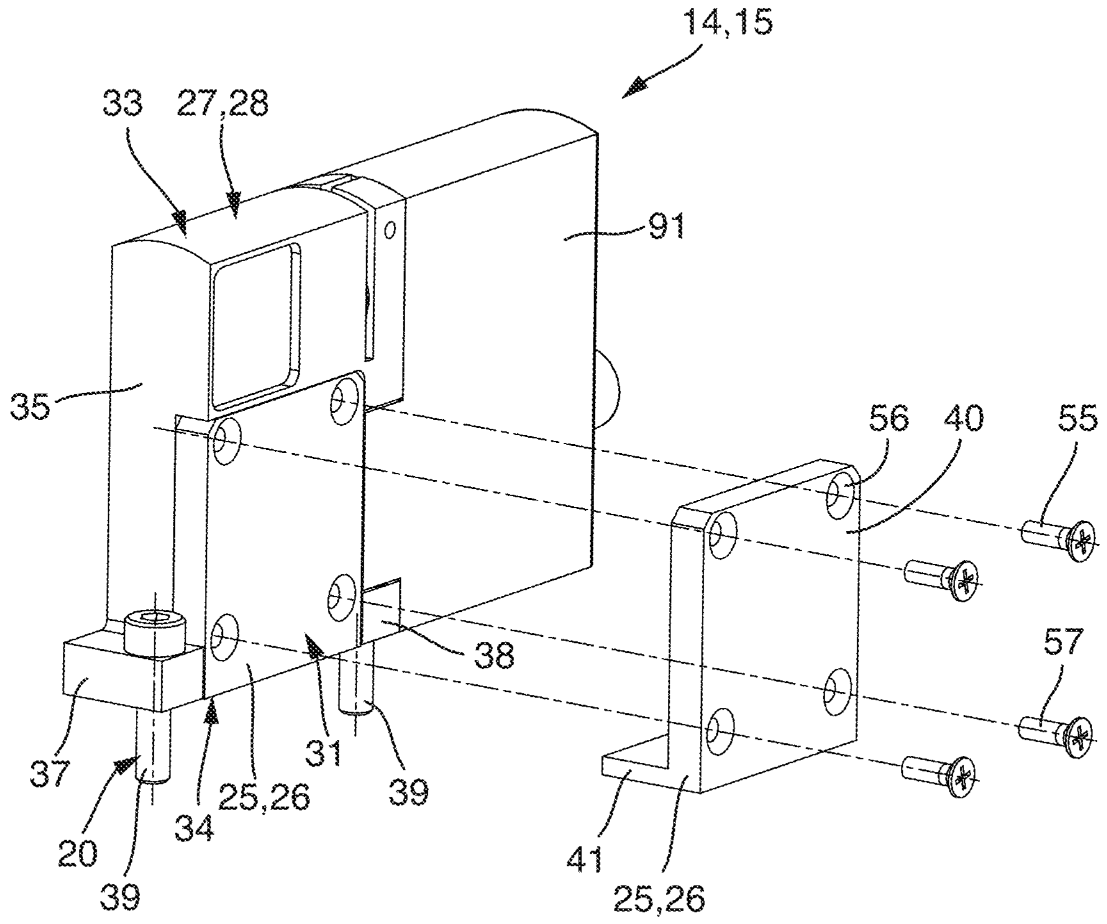
Figure 4:
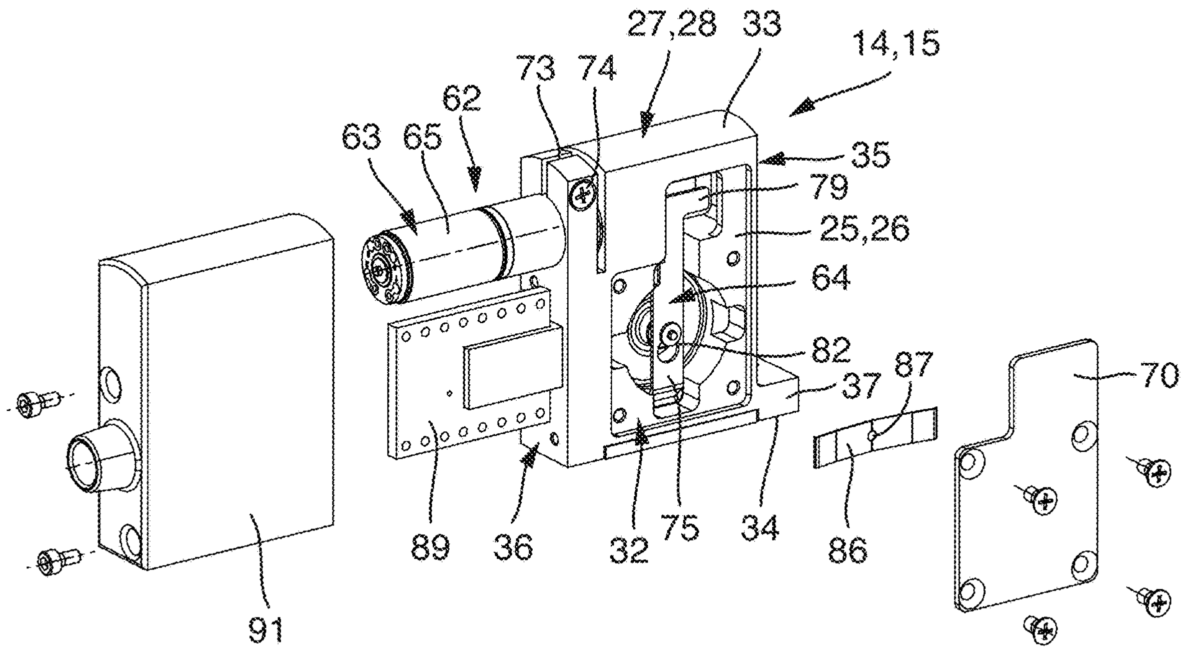
Figure 5:
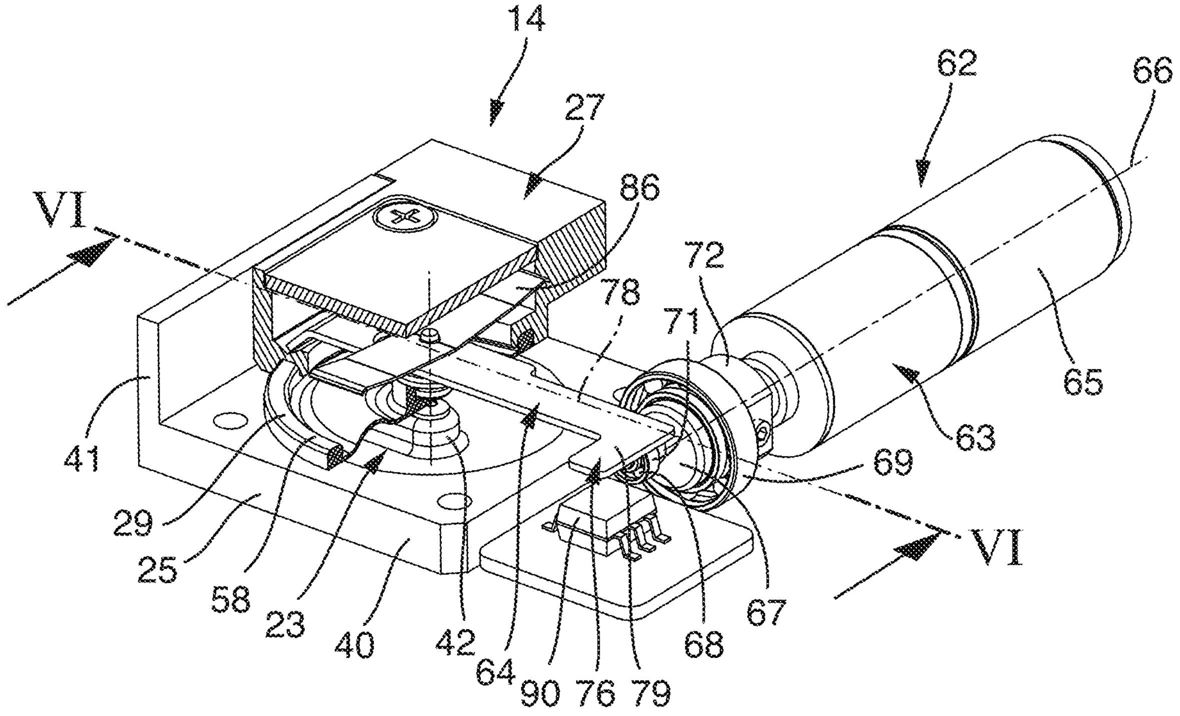

As shown in particular in FIGS. 3, 4 and 5, each of the fluid chambers 23, 24 is designed in a fluid body 25, 26, while each of which in turn is a component of a valve unit housing 27 or recirculation unit housing 28.

An essential aspect of the invention is that each of the fluid chambers 23, 24 is delimited by an elastically deformable diaphragm 29, 30. In the case of the valve unit 14, a valve diaphragm 29 thus delimits the fluid chamber 23 of the valve unit 14 and in the case of the recirculation unit 15, a recirculation diaphragm 30 delimits the fluid chamber 24 of the recirculation unit 15.

A further important aspect of the invention is that the valve unit 14 on the one hand and recirculation unit 15 on the other hand are identical in design, with the exception of the design of the fluid chambers 24, 25.

The structure of the valve unit 14 described below accordingly also applies to the recirculation unit 15, with the exception of the structure of the fluid chamber 23, 24.

The valve unit 14 accordingly possesses the already mentioned valve unit housing 27. The valve unit housing 27 is designed to be cuboidal in the exemplary case. It possesses a front side 31 and a rear side 32 opposite the front side 31. Furthermore, the valve unit housing possesses a top side 33 and a bottom side 34 oriented opposite thereto, which bottom side abuts against the fitting surface 18 of the base plate 17 in the mounted use condition. Finally, the valve unit housing 27 possesses two end sides 35, 36 arranged opposite one another.

To attach the valve unit housing 27 to the fitting surface 18, an attachment flange 37 can for example be provided pointing outwards from the end side 35, wherein on the opposite end side 35 a further attachment flange 38 is provided, which, however, is developed on the front side 31 not as a projection but as a notch developed on the front edge of the valve unit housing 27.

As shown in particular in FIG. 3, each of the attachment flanges 37, 38 have through bores (not shown) which are penetrated by attachment screws 39, which in turn are screwed to the base plate 17 in associated screw holes. In this way, the valve unit 14 is attached to the fitting surface 18 of the base plate 17.

An important aspect is that the already mentioned fluid body 25 is attached as a separate component likewise at the valve unit housing 27.

As already mentioned, the fluid chamber 24 of the valve unit 14 is designed in the fluid body 25 of the valve unit 14.

Figure 6:
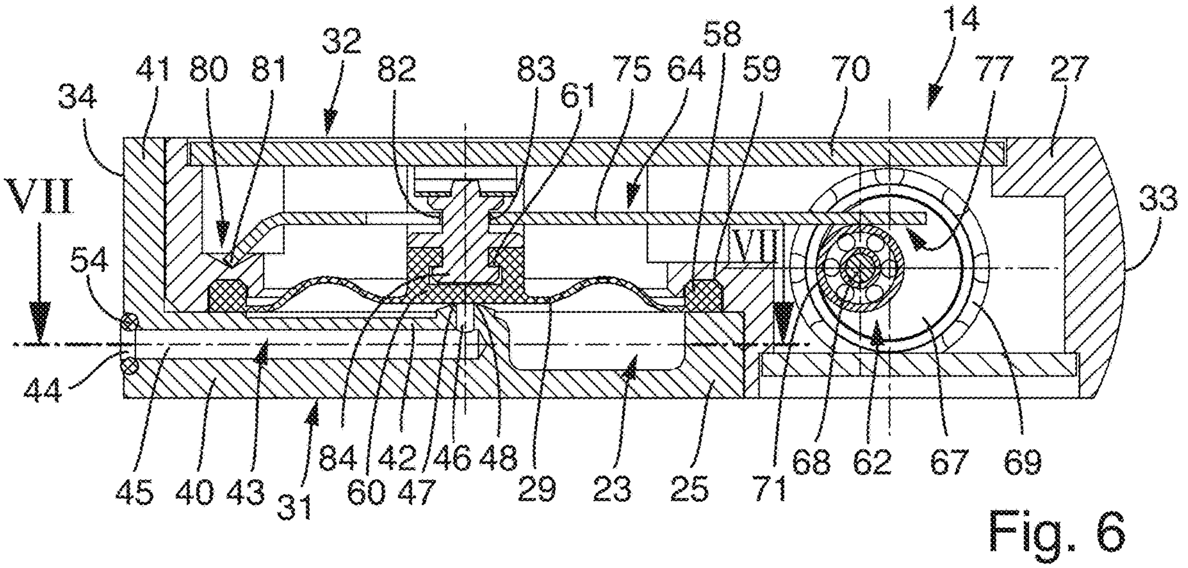
Figure 7:
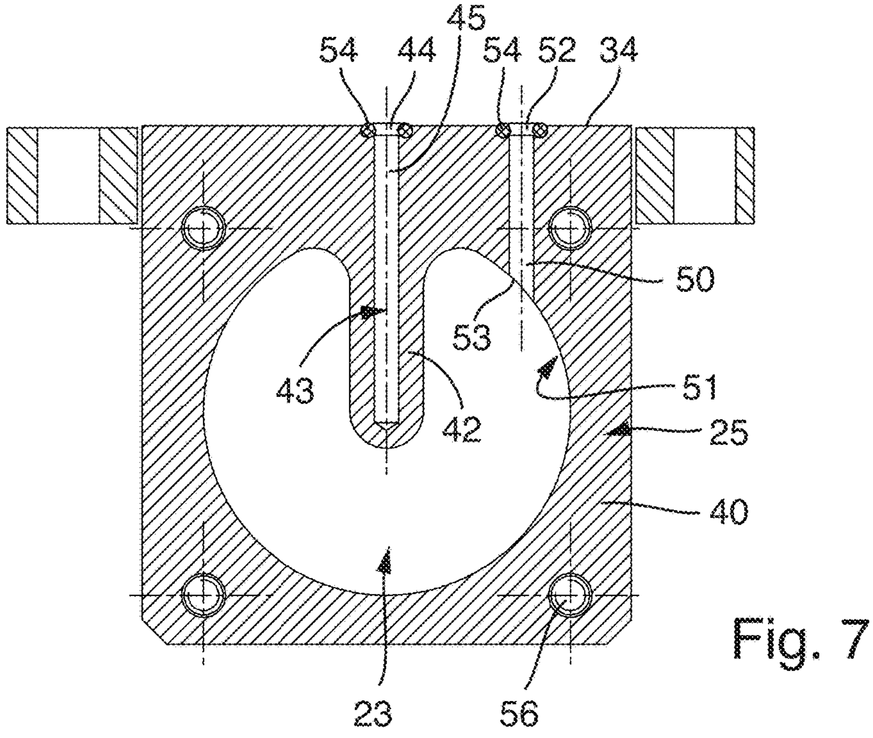

As in particular the synopsis of FIGS. 3, 6 and 7 shows, the fluid body 25 of the valve unit 14 is designed to be like an ‘L’ and possesses a base section 40 and an edge section 41 projecting at right angles from the base section. The edge section 41 forms a part of the bottom side 34 of the valve unit 14. This edge section 41 is flanked in wedge-like manner by both attachment flanges 37, 38 arranged to the left and right thereof.

The fluid chamber 23 designed in the fluid body 25 of the valve unit 14 possesses a substantially circular cross-section, interrupted by a strut-like hump 42 projecting radially inwards, in which hump a feed channel 43 runs. The feed channel 43 extends from a feed opening 44 designed on the strut-like edge section 41 into the centre of the fluid chamber 23, wherein a base channel section 45 of the feed channel 43 is aligned substantially perpendicular to the fitting surface 18. A seat channel section 46, designed in the embodiment example to be relatively short, is attached substantially at right angles to the base channel section 45, which seat channel section leads into the fluid chamber 23 via a valve seat opening 47. As shown in particular in FIG. 6, the valve seat opening 47 is located at a valve seat 48 designed in particular to be cone-shaped, which valve seat is part of the hump 42 projecting inwards.

Figure 8:
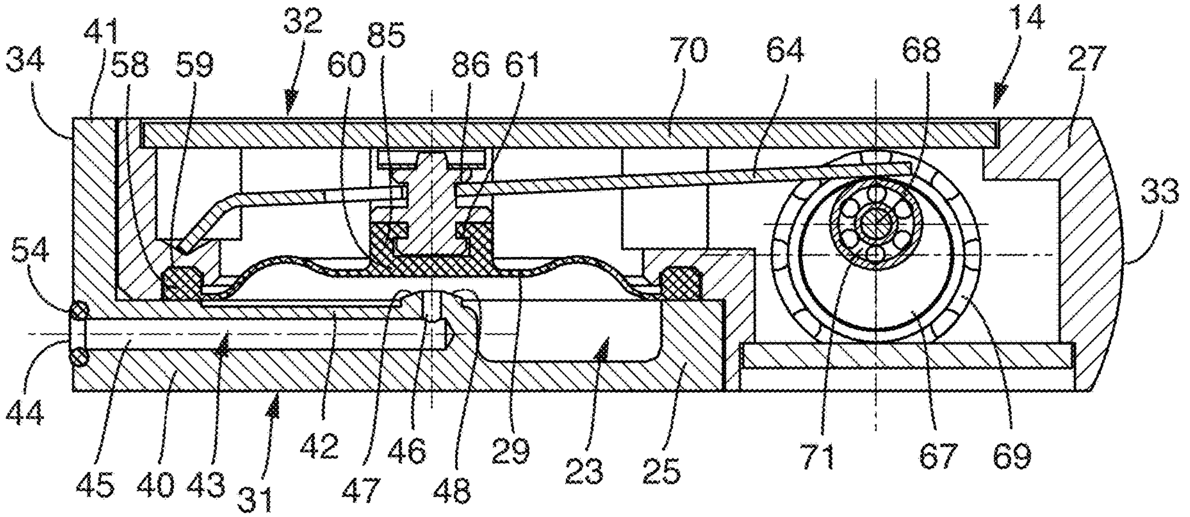
Figure 9:
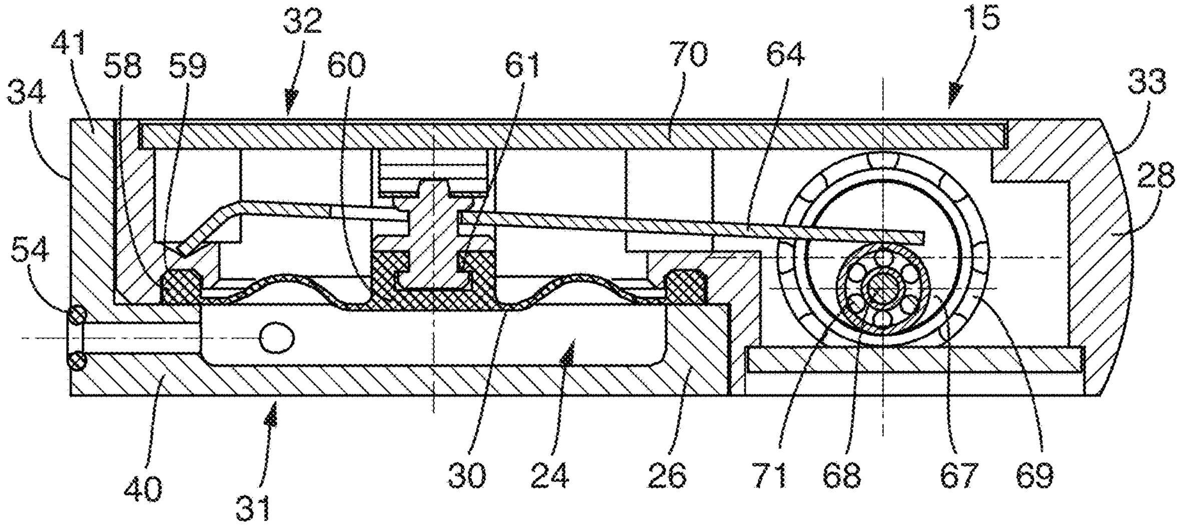

As also shown in FIGS. 6 and 8, the valve diaphragm 29 is associated with the valve seat 48, which diaphragm can open or close the valve seat opening 47 alternately in a manner explained in even more detail below. When the valve seat opening 47 is open, fluid can flow into the fluid chamber 23 of the valve unit 14 via the feed channel 43. When the valve seat opening 47 is closed, the feed of fluid into the fluid chamber 23 is blocked, on the other hand.

Fluid is fed via the already mentioned feed line 20 which is connected to the base plate 17. Fluid then arrives at the feed opening 44 of the valve unit via the channel system in the base plate 17.

As shown in particular in FIG. 7, a further channel, specifically a connection channel 50, discharges into the valve chamber 23 of the valve unit 14. Unlike the previously described feed channel 43, this connection channel 50 does not, however, discharge into the fluid chamber 23 via a central hump 42, but at the circumferential surface 51 of the fluid chamber 23. The connection channel 50 extends proceeding from a connection channel opening 52 designed at the edge section 41 of the fluid body 25 in direction of the fluid chamber 23 and there discharges into the fluid chamber 23 via a discharge opening 53.

Self-evidently it is possible to swap feed channel 43 and connection channel 50, i.e. the fluid is fed via the connection channel 50 which would then become the feed channel.

As also shown in FIG. 7, both of the previously described channels, thus the feed channel 43 and the connection channel 50, lead to the wedge-like edge section 41, i.e. the channels lead to the bottom side 34 of the valve unit 14. As previously described, the valve unit 14 is mounted such that the bottom side 34 of the valve unit 14 and thus the wedge-shaped edge section 41 is in contact with the fitting surface of the base plate 17. Openings (not shown) are designed on the fitting surface of the base plate 17, communicating with the feed channel 43 and the connection channel 50, in particular with the feed opening 44 and the connection channel opening 42. At the interface between valve unit 14 and base plate 17 there is the need for a seal, which is formed for example by the sealing ring 54 shown by way of example in FIG. 7.

As shown in particular in FIG. 3, the fluid body 25 of the valve unit 14 is a component separate from the valve unit housing 27 and is therefore attached to the valve unit housing 27 via suitable attachment means 55. For example a screw connection between the fluid body 25 and the valve unit housing 27 is suitable for this.

It is for example possible to design several attachment holes 56 at the base section 40 of the fluid body, for example four at the figure penetrated by the associated attachment screws 57, which in turn are screwed into associated screw holes (not shown) on the valve unit housing 27.

Overall, the fluid body 25 is a component in which the fluid chamber 23 is designed at the same time during production. The material of the fluid body is directed according to the type of fluid or medium used which is to be metered via the fluid device 11. Expediently, the fluid body is a plastic component, wherein, if used in laboratories, for example polyetheretherketone (PEEK) is used as fluid body material, whereas, with semiconductor applications, the fluid body is more likely to be made of polytetrafluoroethylene or perfluoroalkoxy polymers (PFA).

As mentioned above, and shown by way of example in FIGS. 6 and 8, the fluid chamber 23 of the valve unit 14 is delimited by a valve diaphragm 29.

As shown in particular in FIG. 6 and also in FIG. 8, the valve diaphragm 29 is inserted in the valve unit housing 27 in which an annular diaphragm edge section 58 designed in the manner of a bulb is inserted into an annular groove 59, provided for this purpose and designed on the valve unit housing. The valve diaphragm 29 is then tensioned by attaching the fluid body 25, while the diaphragm edge section 58 is thus tensioned between the fluid body 25 and the valve unit housing.

As also shown in FIG. 6, the valve diaphragm 29 possesses a diaphragm centre 60 which is associated with the valve seat 58 and can close or open a valve seat opening 47 in a manner described in even more detail below. On the rear of the diaphragm centre 60, thus facing away from the fluid chamber 24, is an attachment interface 61 via which the valve diaphragm 29 is coupled to an associated actuation unit 62. The actuation unit 62 serves to actuate the valve diaphragm 29 whereby, in addition to opening and closing the valve opening 40, there is also a change in volume of the associated fluid chamber 23.

The actuation unit 62 has an actuation power unit 63 and an actuation member 64 connected to the valve diaphragm 29 such that an actuation movement transferred by the actuation power unit 62 to the actuation member 64 prompts the actuation member 64 to adopt different positions so that the associated valve diaphragm causes a volume change in the fluid chamber 23 by elastic deformation.

As in particular the synopsis of FIGS. 4, 5 and 6 shows, in the shown exemplary case the actuation power unit 63 is an electric actuation power unit in the form of a step motor or DC motor. The actuation power unit 63 possesses a power unit housing 65 in which the components of the electric actuation power unit, not shown here in more detail, are accommodated. As shown in FIG. 4, the power unit housing 65 is attached to one of the end sides 35 of the valve unit housing 27. The actuation power unit 63 also has an output shaft 67 driven rotationally about an axis of rotation 66, which shaft is coupled eccentrically to an eccentric element 68 arranged at the axis of rotation 66.

As shown in particular in FIG. 5, the eccentric element 68 is designed as an eccentric pin arranged on the front side of the output shaft 67.

As also shown in FIG. 6, the output shaft 67 is mounted rotatable in the valve power unit housing via a rolling bearing 69, wherein the rolling bearing 69 is arranged, in particular pressed in, between a cover 70, described in even more detail below, and a bearing party of the valve unit housing 67. A further rolling bearing 71 is arranged at the eccentric element 68, which bearing has a clearly smaller diameter than the previously described drive shaft rolling bearing 69. This eccentric rolling bearing 71 is connected to the actuation member 64. As shown in particular in FIG. 5, the output shaft 67 projects out of the power unit housing 65, wherein a bearing element 72 is arranged between the power unit housing and the drive shaft rolling bearings 69, via which output shaft the actuation power unit is mounted on the previously described end side 35 of the valve unit housing 27 such that the end side has a slit 73 opening towards the upper side of the valve unit housing 67, with the result that the housing region is divided into two clamping fingers in the region of the end side 35, each of which fingers has a bent recess (not shown) and thus receive the bearing element 72 associated with the output shaft between them. The clamping fingers can move towards one another by means of a clamping screw 74 introduced from the front or rear side of the valve unit 27 into a clamping boring designed in one of the clamping fingers and screwed to the other clamping finger, whereby there is a clamping on the bearing element 72, leaving the actuation power unit thus secured to the valve unit housing 27.

As already mentioned above, the actuation unit 62 possesses an actuation member 64 which is designed in the exemplary case as an actuating lever. The actuating lever is designed to be plate-shaped and possesses a relatively long extended lever base section 75, wherein an actuation surface 77 is designed in the region of the free lever end 76 directed to the fluid chamber, which surface is in contact with the eccentric rolling bearing 71.

As shown in particular in FIG. 4, the free lever end 76, which simultaneously also forms the closure of the lever base section 75, can be designed with a lever axle 79 aligned transverse to the longitudinal axis 78 of the actuation lever, at the bottom side of which lever axle is designed the actuation surface 77.

The actuating lever is also clamped fast at its other lever end 80 opposite the free lever end 76 via a lever bearing 81. For this, the actuating lever is kinked at the other lever end 80 and engages in a parabolic recess at the valve unit housing 27 where it is then firmly clamped.

An important aspect is that the actuation member 64, thus in the exemplary case the actuating lever, is coupled to the valve diaphragm 39. For this, the actuating lever possesses a coupling interface 82 in the region of its lever base section, which interface has a continuous hole 83 designed in the lever base section 75. The continuous hole 83 is penetrated by a coupling pin 84, which in turn is designed like a hammerhead at the bottom, and is thus part of the attachment interface 61 between the coupling pin 84 and the valve diaphragm 29.

As shown for example in FIG. 6, the valve diaphragm 29 possesses a pin 85 (FIGS. 8 and 12) projecting upwards at its diaphragm centre 60, which pin has a centric recess in which, depending on the type of groove and spring, the hammerhead section of the coupling pin 64 is arranged.

The result of this is that an actuation movement exerted on the valve diaphragm 29, acting on the actuating lever and as a consequence of the actuation power unit 62, is transferred to the valve diaphragm 29.

As shown in particular in FIG. 4, a reset element 86 for resetting the actuation member 64 and the linked diaphragm membrane 29 is associated with the actuation member 64 within the meaning of reducing the volume of the associated fluid chamber 23.

In the exemplary case, the reset element is designed as a leaf spring. As also shown in FIG. 6, the leaf spring is connected to the coupling pin 84 such that the leaf spring has a continuous hole 87 at the centre, and is placed with this continuous hole 87 on a bearing pin projecting upwards on the top side of the coupling pin 84. The leaf spring possesses a curve, wherein the region of the leaf springs is arranged with the continuous hole 87 closer to the fluid chamber than the two opposite spring ends, each of which is supported at the inside of the already mentioned cover 70. The diaphragm is pressed into a normally closed position by this arrangement, in which position the valve seat opening 87 is closed by the diaphragm. To open the valve seat opening 47 pressure must be applied against the spring force of the leaf spring.

The already mentioned cover 70 has several tasks. For one, it supports the leaf spring at the bottom, and for another it closes the fluid body 25 at the end. It also offers a screw connection as a means of attachment for the cover.

As also shown in FIG. 4, an electronics element 89 is located on the end side 35 on which the actuation power unit 63 is also designed.

An important aspect is that a stroke sensor 90 for determining the stroke of the actuation lever is associated with the actuating lever. The free lever end 76 of the actuation lever is associated with the stroke sensor 90, and the lever end measures the stroke of the lever end of the actuation lever.

The previously described lever axle 79 also serves further to provide a relatively large measuring surface to the stroke sensor 90. The stroke sensor 90 is set up for contactless measurement of the stroke of the actuation lever, for example an inductive stroke sensor can be used.

As shown in particular in FIG. 4, a covering hood 91 is provided for covering the actuation power unit 63 arranged at the end side 35 and the electronics component or the electronics element 89. An electric voltage supply of the actuation power unit 63 can be set up via the covering hood 91, for example via a through opening arranged on the end side of the cover hood.

As already mentioned, the recirculation unit 15 is identical in design to the valve unit 14, with the exception of the different design of the fluid body 26 and the fluid chamber 24. In so doing, all components of the valve unit 14 are also used in the recirculation unit 15, with the result that they need not be described again here.

Figure 10:
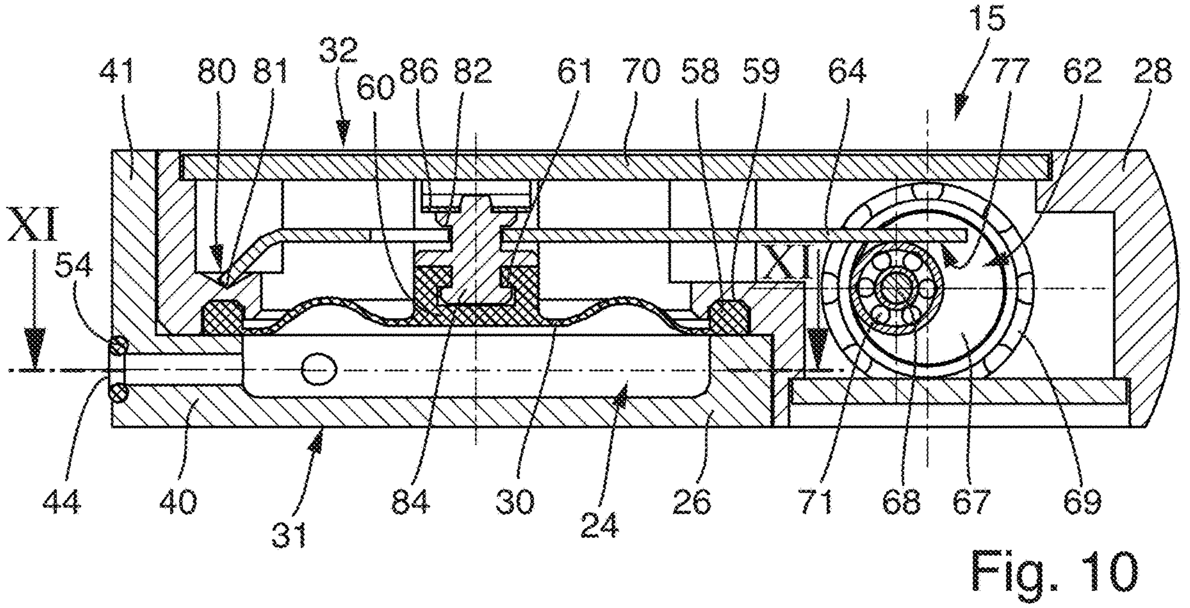
Figure 11:
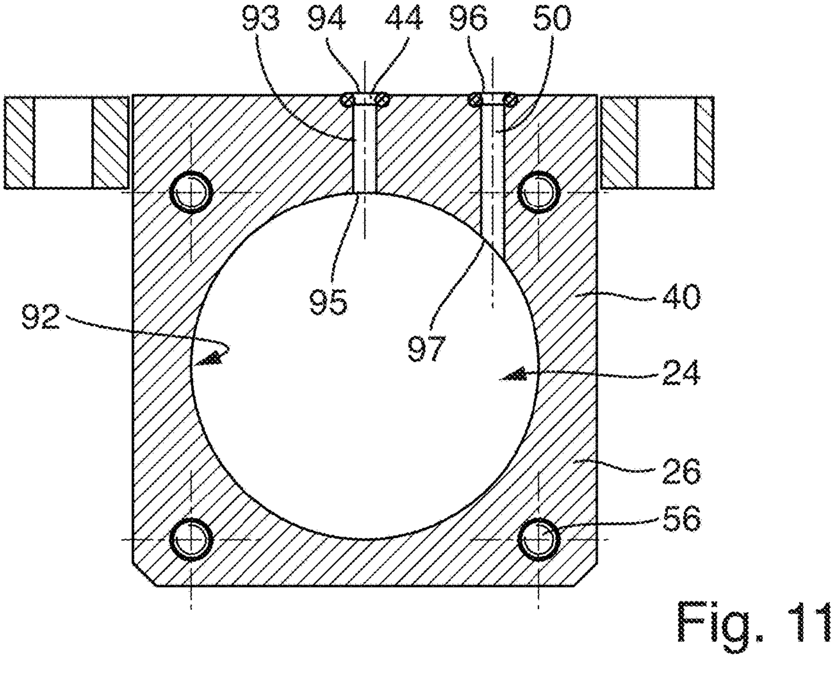
Figure 12:
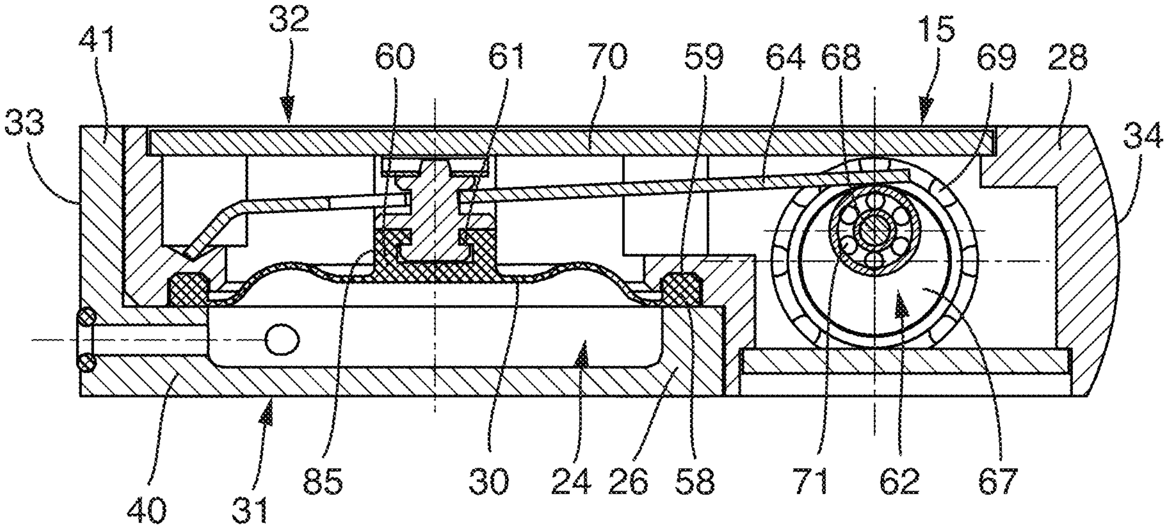

As can be seen in particular in FIG. 10, the fluid chamber 24 of the recirculation unit is not penetrated with a strut-shaped hump. The cross-section of the fluid chamber 24 of the recirculation unit 15 is circular. A discharge channel 93 discharges into the fluid chamber 25 of the recirculation unit 15. The discharge channel 93 extends between a discharge channel opening 94 at the edge section 41 of the fluid body 26 as far as a first discharge opening 95 in the region of the peripheral wall 92 of the fluid chamber 24. As already mentioned, valve unit 14 and recirculation unit 15 are connected to one another via a connection channel 50. The connection channel in the recirculation unit 15 extends from a connection channel opening 96 at the edge section 41 of the fluid body 26 as far as a second discharge opening 97. It is possible that, as shown in FIG. 10, the channel aligned centrally in the direction of the centre of the fluid chamber 24 functions as a discharge channel 93 and the other channel, arranged eccentric thereto, as a connection channel, but it would also be conceivable to provide the centric channel as a connection channel and the channel arranged eccentric hereto as a discharge channel.

An important aspect is that there is a continuous fluidic connection between the connection channel 50 and the discharge channel 93 here in the recirculation unit 15. The recirculation diaphragm 30 associated here with the fluid chamber 24 thus serves merely to establish a volume enlargement or volume reduction. With a volume enlargement, a negative pressure is generated in the fluid chamber 24, which negative pressure sucks the medium back via the discharge channel into the fluid chamber 24, whereby undesired dripping in the region of the discharge opening 22 of the discharge nozzle 21 is prevented.

The function of the fluid device as a metering device in connection with a microtiter plate 12 can be described as follows:

Firstly, the fluid device is arranged with its discharge nozzle 21 over the cavity 13 to be filled. In this position, the valve diaphragm abuts against the valve seat 28, meaning the valve seat opening 47 is thus closed. For metering, the actuation power unit is then set in motion, whereby the eccentric element 68 moves clockwise via the rotational movement of the output shaft. This movement of the eccentric element 68 acts on the free lever end 76 of the actuation lever which for its part is pivoted into the position shown in FIG. 8. In so doing, the coupled-in valve diaphragm 29 is lifted from the valve seat 48 and fluid or medium to be dispensed or metered arrives in the fluid chamber 23 of the valve unit 14 via the feed channel. From there, fluid to be metered arrives back in the base plate 17 via the connection channel 50, and from there in the base plate 17 via the connection channel 50 in the recirculation unit 15 in the fluid chamber 24 of the recirculation unit 15 via the channel system. From there, the fluid to be metered arrives back in the base plate 17 via the discharge channel 83 of the recirculation unit 15 and from there arrives at the discharge opening 22 via the channel arranged in the discharge nozzle and is dispensed from there into the associated cavity 13.

It is possible to control or regulate the quantity to be metered via the degree of opening of the valve seat opening 47. The stroke sensor 90 which measures on the free lever end can carry out the regulation. Different degrees of opening are associated with different voltage values of the stroke sensor in a previously carried out calibration run. Thus a voltage value of 5 volts can for example be associated with a 100% degree of opening.

With the metering process, the distance between the stroke sensor 90 and the free lever end is changed by actuating the actuation power unit 63, and a voltage value is generated. As long as the voltage value remains for example not yet at the predetermined 5-volt limit, the degree of opening of 100% has not yet been reached. This means that the actuation power unit remains in operation until the aforementioned voltage value is achieved. The actuation power unit 63 is then switched off.

Once the quantity to be metered has been dispensed, the recirculation unit 15 is activated. For this, the actuation power unit of the recirculation unit 15 is activated, whereby the output shaft is placed into a rotational movement, entraining the eccentric element 68. As a result, the coupled-in actuating lever is moved from the position shown in FIG. 9 into a position shown in FIG. 12 via the position shown in FIG. 10, wherein the position of the actuation lever shown in FIG. 12 permits the recirculation diaphragm 30 to ensure the maximum volume enlargement of the fluid chamber, whereby a negative pressure is produced, with the result that fluid present in the discharge nozzle in the channel is recirculated into the fluid chamber 24 of the recirculation unit 15 via the discharge channel 93, whereby subsequent dripping in the region of the discharge opening 22 of the discharge nozzle 21 is prevented. It is thus ensured that the predetermined intended fill level can also be maintained with precision.

The invention claimed is:

1. A fluid device comprising:

at least one valve unit and at least one recirculation unit, each having a fluid chamber designed to receive a fluid, which channels are fluidically connected to one another via at least one connection channel, wherein at least one feed channel discharges into the fluid chamber of the valve unit and a discharge channel discharges into the fluid chamber of the recirculation unit, and wherein each of the fluid chambers is delimited by an elastically deformable diaphragm, and wherein the valve unit and the recirculation unit each contain an actuation unit through which an associated valve diaphragm or recirculation diaphragm can be adjusted within the meaning of a change in volume of the associated fluid chamber, wherein a fluidic connection can be established between the feed channel and the connection channel by the valve diaphragm and that a continuous fluidic connection exists between the connection channel and the discharge channel via the fluid chamber of the recirculation unit.

2. The fluid device according to claim 1, wherein the valve diaphragm and the recirculation diaphragm are arranged in diaphragm planes parallel to one another.

3. The fluid device according to claim 1, wherein the valve diaphragm and the recirculation diaphragm are identically designed.

4. The fluid device according to claim 1, wherein diaphragm centres of the valve diaphragm and the recirculation diaphragm lie on a common diaphragm axis.

5. The fluid device according to claim 1, wherein a base plate with a fitting surface, on which the valve unit and the recirculation unit are arranged and attached by means of attachment means.

6. The fluid device according to claim 5, wherein the valve diaphragm and the recirculation diaphragm are arranged in diaphragm planes, wherein the diaphragm planes of the valve diaphragm and the recirculation diaphragm are aligned perpendicular to the fitting surface.

7. The fluid device according to claim 5, wherein the base plate has at least one supply opening for feeding fluid and an outlet opening is provided for the fluid, and a fluid channel system communicating with the channels in the valve unit and the recirculation unit extends between the supply opening and the outlet opening.

8. The fluid device according to claim 5, wherein a discharge nozzle fluidically connected to the outlet opening at the base plate, at the free end of which nozzle a discharge opening is arranged for discharging fluid.

9. The fluid device according to claim 5, wherein a feed opening of the feed channel and a connection channel opening of the connection channel of the valve unit are arranged on the same side of the valve unit, preferably on a bottom side of the valve unit facing the fitting surface.

10. The fluid device according to claim 5, wherein a connection channel opening of the connection channel and a discharge channel opening of the discharge channel of the recirculation unit are arranged on the same side of the recirculation unit, preferably on a bottom side of the recirculation unit facing the fitting surface.

11. The fluid device according to claim 1, wherein the fluid chambers of the valve unit and of the recirculation unit have the same diameter.

12. The fluid device according to claim 1, wherein the actuation unit of the valve unit and actuation unit of the recirculation unit are identically designed.

13. The fluid device according to claim 1, wherein the actuation unit has an actuation power unit and an actuation member connected to the diaphragm such that an actuation movement transferred by the actuation power unit to the actuation member prompts the actuation member to adopt different positions so that the associated diaphragm causes a volume change in the fluid chamber by elastic deformation.

14. The fluid device according to claim 13, wherein the actuation member is designed as an in particular plate-shaped actuating lever, firmly clamped on one side via a lever bearing, is coupled to the associated diaphragm via a catch element and at its free lever end is coupled to the actuation power unit such that the actuation movement transferred by the actuation power unit prompts the actuating lever to pivot.

15. The fluid device according to claim 14, wherein the actuation power unit is designed as an electric actuation power unit, in particular an actuation power unit in the form of a step motor or DC motor.

16. The fluid device according to claim 5, wherein a longitudinal axis of the actuation unit is designed parallel to the fitting surface.

17. The fluid device according to claim 14, wherein the actuation power unit has an output shaft driven rotationally about an axis of rotation, which shaft is coupled to an eccentric element arranged eccentric to the axis of rotation, which element is coupled to the actuating lever, in particular the free lever end thereof.

18. The fluid device according to claim 13, wherein a reset element for resetting the actuation member and the linked diaphragm is associated with the actuation member within the meaning of reducing the volume of the associated fluid chamber.

19. The fluid device according to claim 18, wherein the reset element is designed as a spring, in particular leaf spring.

20. The fluid device according to claim 1, wherein the fluid chamber of the valve unit has a hump-shaped channel which forms the valve seat which can be sealed by the associated valve diaphragm.

21. The fluid device according to claim 14, wherein a stroke sensor for determining the stroke of the actuation lever.

22. The fluid device according to claim 21, wherein the free lever end of the actuation lever is associated with the stroke sensor, and the lever end measures the stroke of the lever end of the actuation lever.

* * * * *